United States Patent
Jacobson (10) Patent No.: US 10,351,299 B2
(45) Date of Patent: Jul. 16, 2019

(54) NESTABLE POT SET

(71) Applicant: Yitzchak Jacobson, Brooklyn, NY (US)

(72) Inventor: Yitzchak Jacobson, Brooklyn, NY (US)

( * ) Notice: Subject to any disclaimer, the term of this patent is extended or adjusted under 35 U.S.C. 154(b) by 115 days.

(21) Appl. No.: 15/386,983

(22) Filed: Dec. 21, 2016

(65) Prior Publication Data

US 2018/0170615 A1   Jun. 21, 2018

(51) Int. Cl.
| | | |
|---|---|---|
| *B65D 21/032* | (2006.01) | |
| *B65D 21/02* | (2006.01) | |
| *A47J 27/12* | (2006.01) | |

(52) U.S. Cl.
CPC .......... *B65D 21/0233* (2013.01); *A47J 27/12* (2013.01)

(58) Field of Classification Search
CPC ........ B65D 21/0233; A47J 27/12; A47J 36/06
USPC .................................................. 206/818, 514
See application file for complete search history.

(56) References Cited

U.S. PATENT DOCUMENTS

| | | | | |
|---|---|---|---|---|
| 5,022,550 A | * | 6/1991 | Ruiz ...................... | A47J 36/06 206/514 |
| 5,253,758 A | * | 10/1993 | Bissell, II ............... | A47J 27/12 206/508 |
| 5,692,617 A | * | 12/1997 | Adams ............... | B65D 21/0223 206/501 |
| 2006/0200996 A1 | * | 9/2006 | Pearman ................... | B26B 1/04 30/158 |
| 2008/0179211 A1 | * | 7/2008 | Kutsch .................... | A47J 45/07 206/514 |

* cited by examiner

*Primary Examiner* — Stephen J Castellano
(74) *Attorney, Agent, or Firm* — Sughrue Mion, PLLC (57) ABSTRACT

A nestable set of pots including a plurality of pots which are nestable together and a plurality of lids, each lid corresponding to a pot and being removably attached to an outside bottom surface thereof. An articulated exterior handle for the pots, having a first retracted position and a second extended position.

8 Claims, 14 Drawing Sheets

NESTABLE POT SET

FIELD OF THE INVENTION

The present invention relates to household utensils generally and more particularly to pots and lids therefor.

BACKGROUND OF THE INVENTION

There are known a large variety of at least partially nestable pots.

SUMMARY OF THE INVENTION

The present invention seeks to provide an improved nestable pot set.

There is thus provided in accordance with a preferred embodiment of the present invention a nestable set of pots including a plurality of pots which are nestable together and a plurality of lids, each lid corresponding to a pot and being removably attached to an outside bottom surface thereof.

Preferably, at least one of the plurality of lids is magnetically attached to an outside bottom surface of a corresponding pot.

In accordance with a preferred embodiment of the present invention at least one of the plurality of lids includes a base portion and a handle portion, the handle portion being recessed with respect to at least a peripheral portion of the base portion. Additionally or alternatively, at least one of the plurality of lids includes a base portion and a handle portion, the handle portion including a magnet. Alternatively, at least one of the plurality of lids includes a base portion and a handle portion, the base portion including a magnet.

In accordance with a preferred embodiment of the present invention at least one of the plurality of pots includes at least one articulated exterior handle. Additionally, the articulated exterior handle has a first retracted position and a second extended position. Additionally, the articulated exterior handle includes at least one magnet for selectably retaining the articulated exterior handle in the first retracted position. Additionally or alternatively, the articulated exterior handle includes at least one magnet for selectably retaining the articulated exterior handle in the second extended position.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
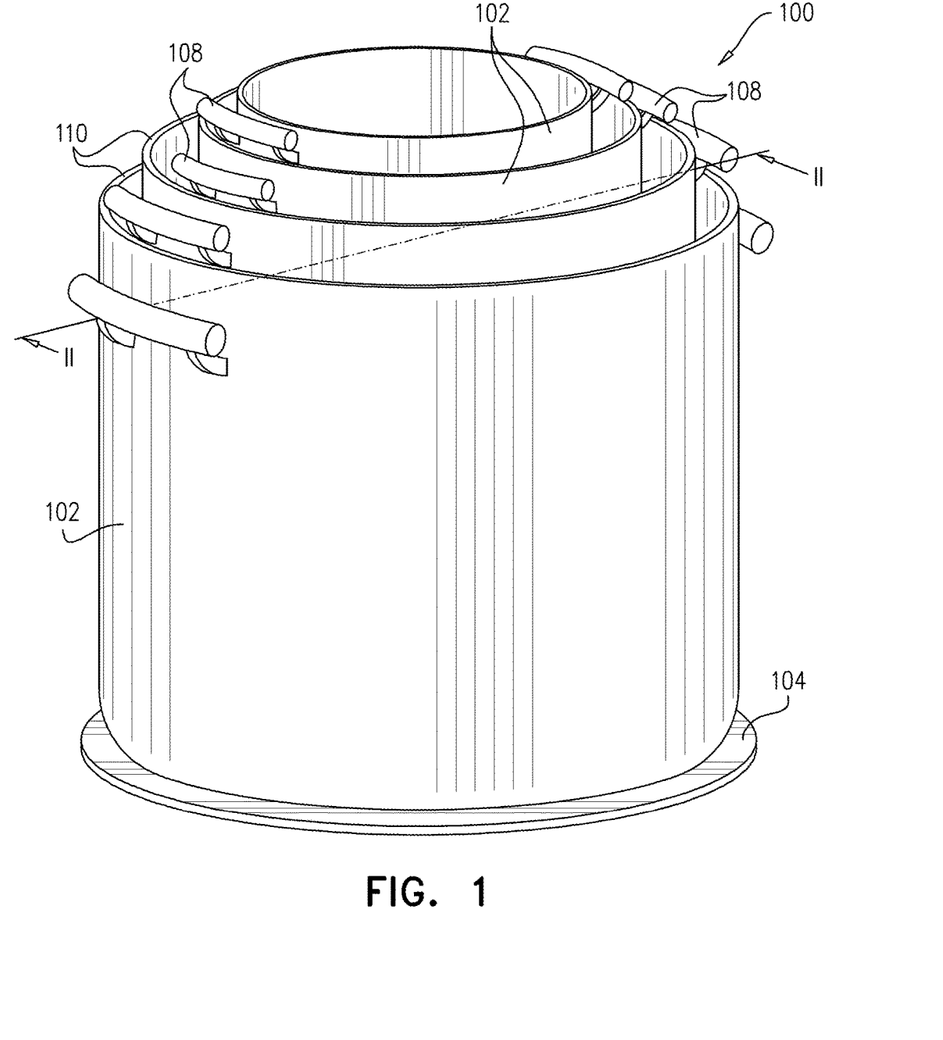
FIG. 1 is a simplified illustration of a partially nested set of pots constructed and operative in accordance with one embodiment of the present invention, each pot having a lid removably attached thereto at a bottom thereof.
Figure 2:
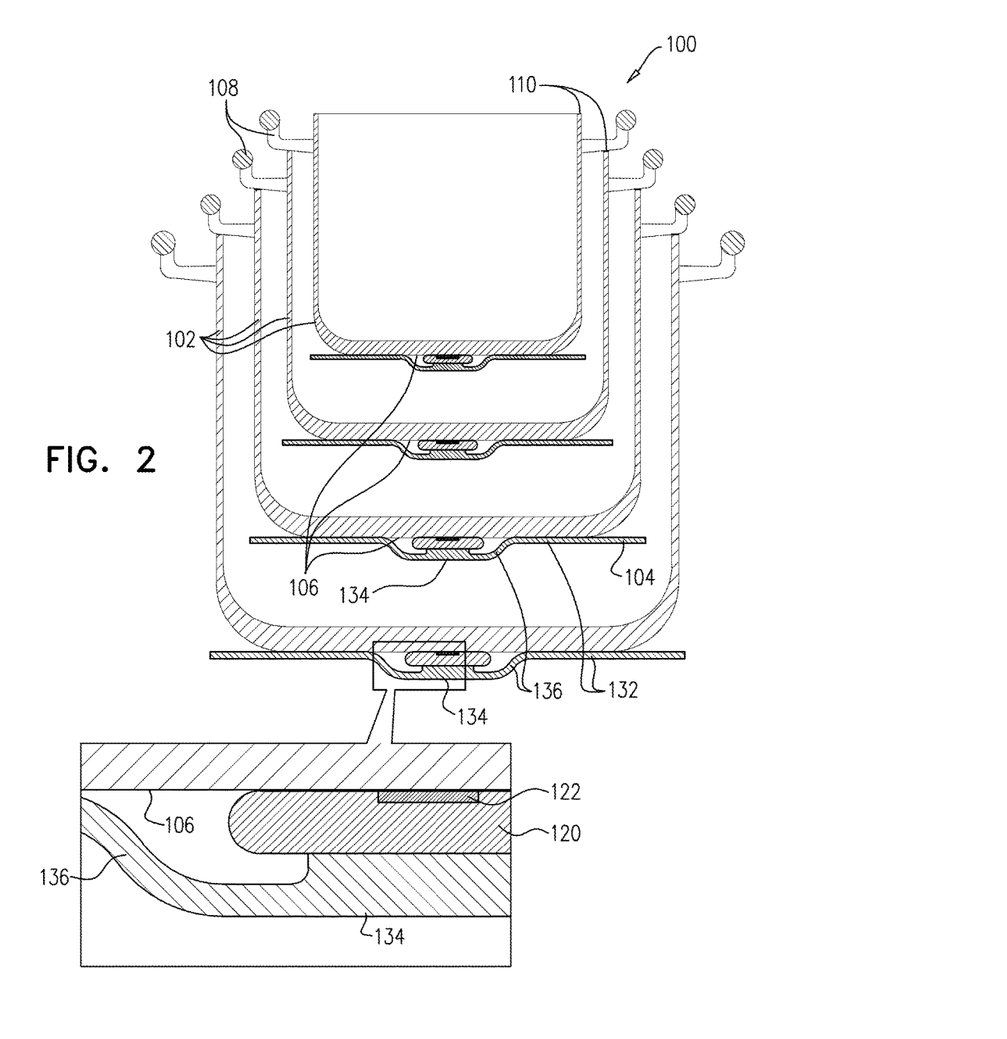
FIG. 2 is a simplified sectional illustration taken along lines II-II in FIG. 1.

Reference is now made to FIG. 1, which is a simplified illustration of a partially nested set 100 of pots 102 constructed and operative in accordance with one embodiment of the present invention, each pot 102 having a lid 104 removably attached thereto at a bottom thereof, and to FIG. 2, which is a simplified sectional illustration, taken along lines II-II in FIG. 1. Removable attachment of each lid 104 to its corresponding pot 102 is preferably achieved by using a magnet, but may be realized by any suitable alternative attachment mechanism, such as a clip.

As seen in FIGS. 1 & 2, there is provided a partially nested plurality of pots 102 of a variety of sizes, each having removably attached thereto, at a bottom outside surface 106 thereof, a lid 104 of a size corresponding to the size of the pot 102. In the embodiment of FIGS. 1 & 2, each of pots 102 includes a pair of pot handles 108 which extend outwardly therefrom to an extent that each handle 108 of each of the pots 102 except the largest pot 102 rests on the top edge 110 of another pot 102 into which it is partially nested.

In the embodiment of FIGS. 1 & 2, each lid 104 is preferably formed with a recessed lid handle 120, which is preferably provided, on a top surface thereof, with an inlaid magnet 122, which is removably magnetically attached to bottom outside surface 106 of a correspondingly sized pot 102. It is appreciated that the entire pot 102, or, alternatively, the bottom outside surface 106 thereof, is formed of a ferromagnetic material, such as many types of stainless steel, which is magnetically attracted to inlaid magnet 122.

As seen particularly clearly in FIG. 2, in the embodiment of FIGS. 1 and 2, each pot lid includes an outer planar ring portion 132 and a central inner planar portion 134, which is recessed with respect to outer planar ring portion 132 and integrally joined thereto by an intermediate ring portion 136, preferably having a curved cross section. Recessed lid handle 120 is preferably fixedly attached to central inner planar portion 134 of lid 104. Preferably a top surface of recessed lid handle 120 is co-planar with a top surface of outer planar ring portion 132.

Figure 3:
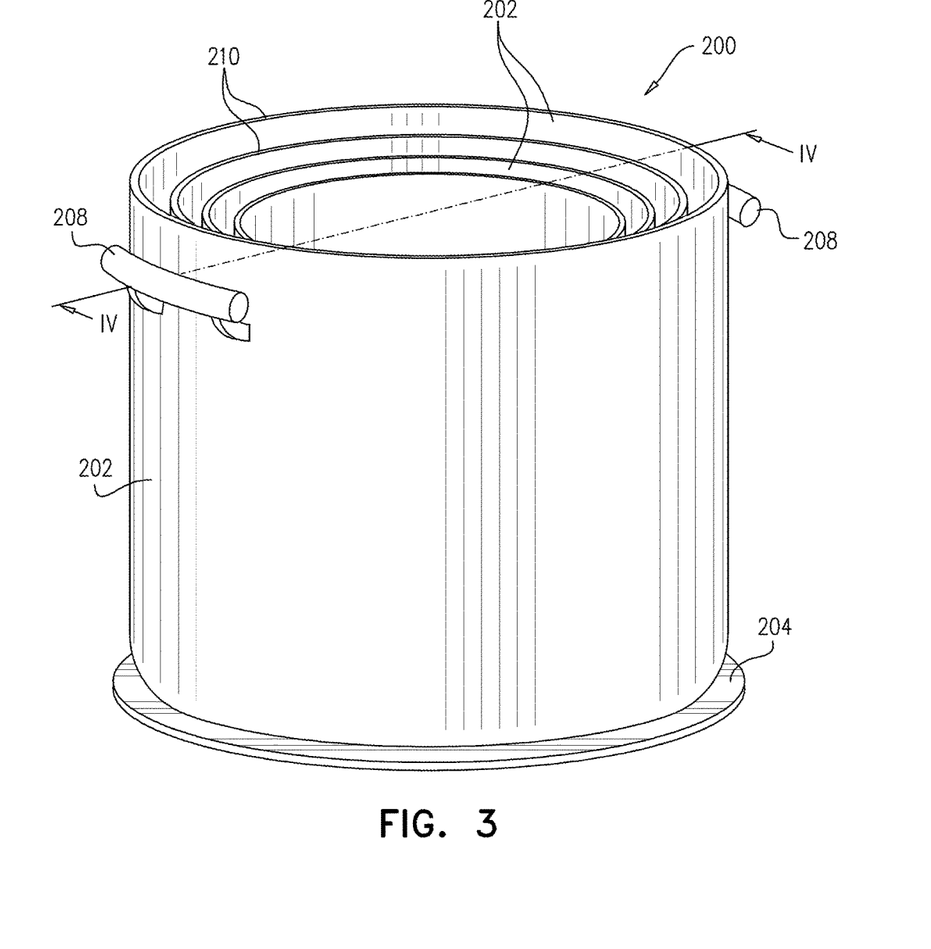
FIG. 3 is a simplified illustration of a fully nested set of pots constructed and operative in accordance with another embodiment of the present invention, each pot having a lid removably attached thereto at a bottom thereof.
Figure 4:
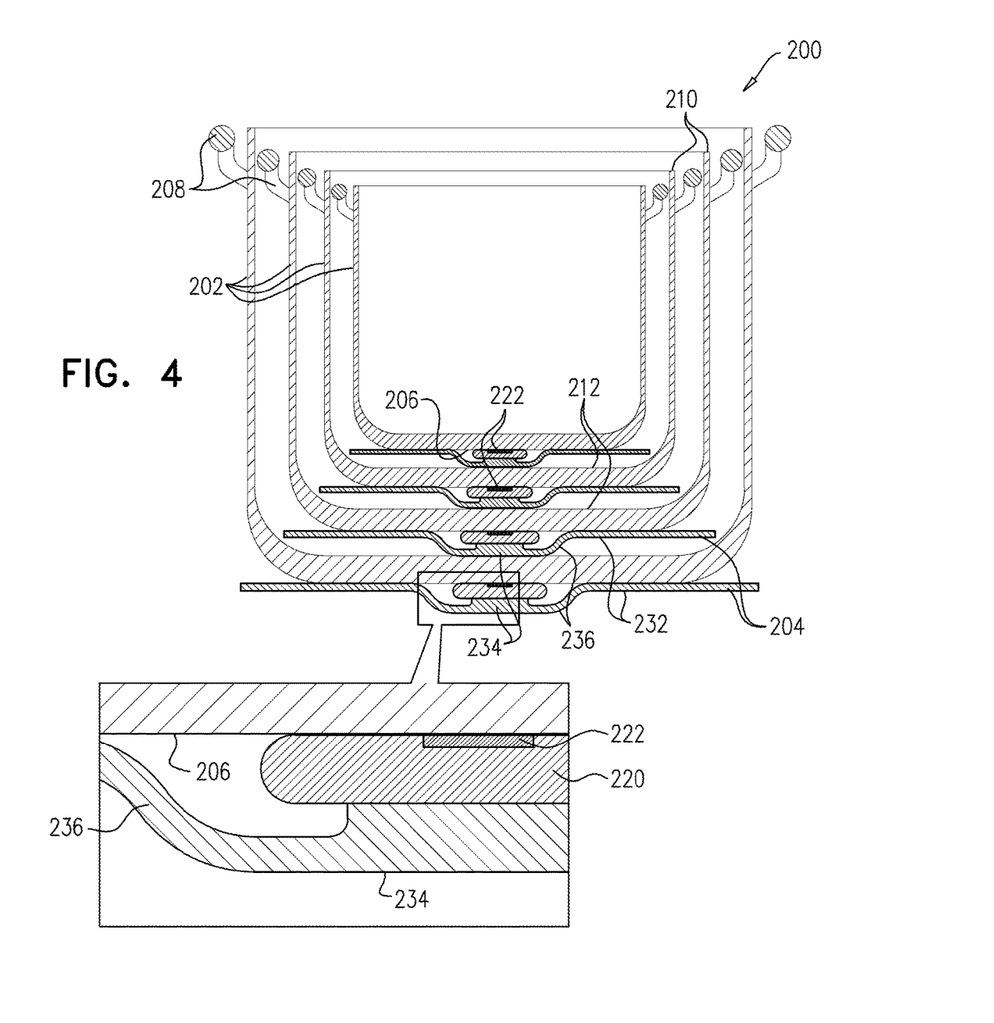
FIG. 4 is a simplified sectional illustration taken along lines IV-IV in FIG. 3.

Reference is now made to FIG. 3, which is a simplified illustration of a fully nested set 200 of pots 202 constructed and operative in accordance with another embodiment of the present invention, each pot 202 having a lid 204 removably attached thereto at a bottom thereof, and to FIG. 4, which is a simplified sectional illustration, taken along lines IV-IV in FIG. 3.

As seen in FIGS. 3 & 4, there is provided a fully nested plurality of pots 202 of a variety of sizes, each having removably attached thereto, at a bottom outside surface 206 thereof, a lid 204 of a size corresponding to the size of the pot 202. As in the embodiment of FIGS. 1 & 2, each of pots 202 seen in FIGS. 3 & 4 includes a pair of pot handles 208 which extend outwardly therefrom, but in contrast to the embodiment of FIGS. 1 & 2, not to an extent that each handle 208 of each of the pots 202 rests on the top edge 210 of another pot 202 into which it is partially nested. Rather, in the embodiment of FIGS. 3 & 4, the lid of an upper pot 202 rests on a bottom inner surface 212 of a lower pot 202 in which the upper pot 202 is fully nested.

In the embodiment of FIGS. 3 & 4, similarly to the embodiment of FIGS. 1 & 2, each lid 204 is preferably formed with a recessed lid handle 220, which is preferably provided on a top surface thereof with an inlaid magnet 222, which is removably magnetically attached to bottom outside surface 206 of a correspondingly sized pot 202. It is appreciated that the entire pot 202, or, alternatively, the bottom outside surface 206 thereof, is formed of a ferromagnetic material, such as many types of stainless steel, which is magnetically attracted to inlaid magnet 222.

As seen particularly clearly in FIG. 4, in the embodiment of FIGS. 3 and 4, each pot lid 204 includes an outer planar ring portion 232 and a central inner planar portion 234, which is recessed with respect to outer planar ring portion 232 and integrally joined thereto by an intermediate ring portion 236, preferably having a curved cross section. Recessed lid handle 220 is preferably fixedly attached to central inner planar portion 234 of lid 204. Preferably a top surface of recessed lid handle 220 is co-planar with a top surface of outer planar ring portion 232.

Comparing the embodiment of FIGS. 3 & 4 with the embodiment of FIGS. 1 & 2, it is additionally seen that the orientation of each lid 204 relative to the pot 202 to which it is attached is the same as the orientation of each lid 104 relative to the pot 102 to which it is attached.

Figure 5:
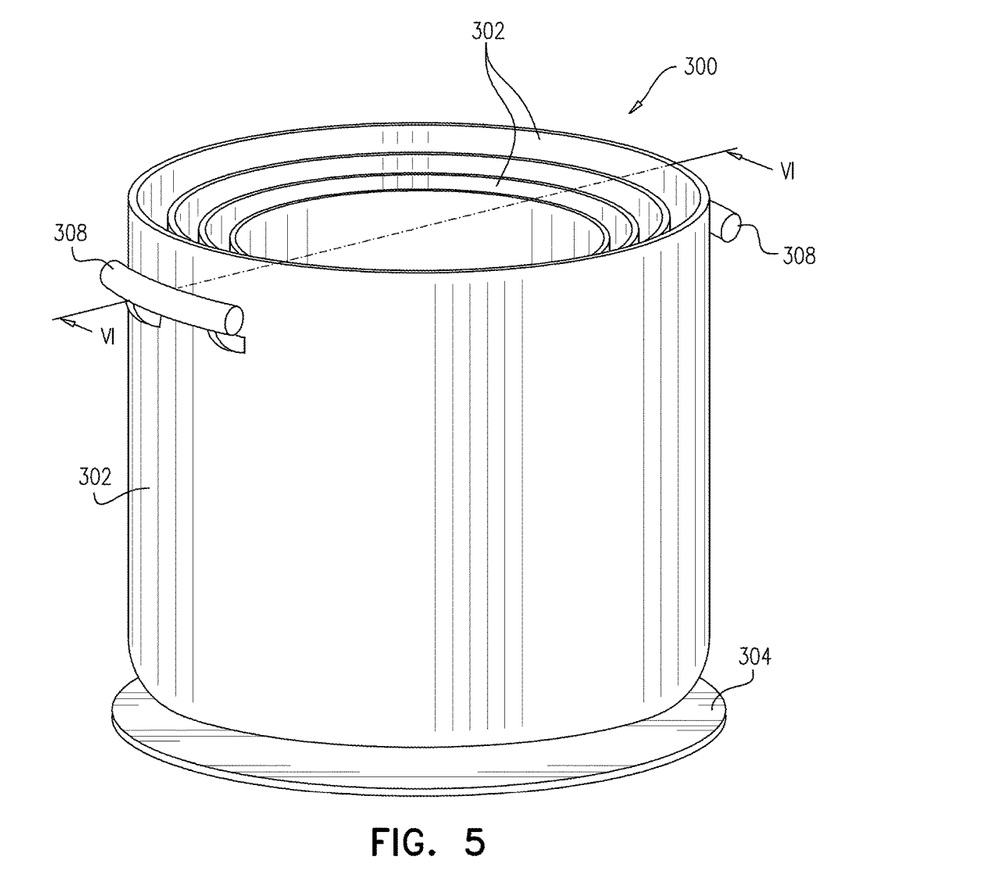
FIG. 5 is a simplified illustration of a fully nested set of pots constructed and operative in accordance with yet another embodiment of the present invention, each pot having a lid removably attached thereto at a bottom thereof.
Figure 6:
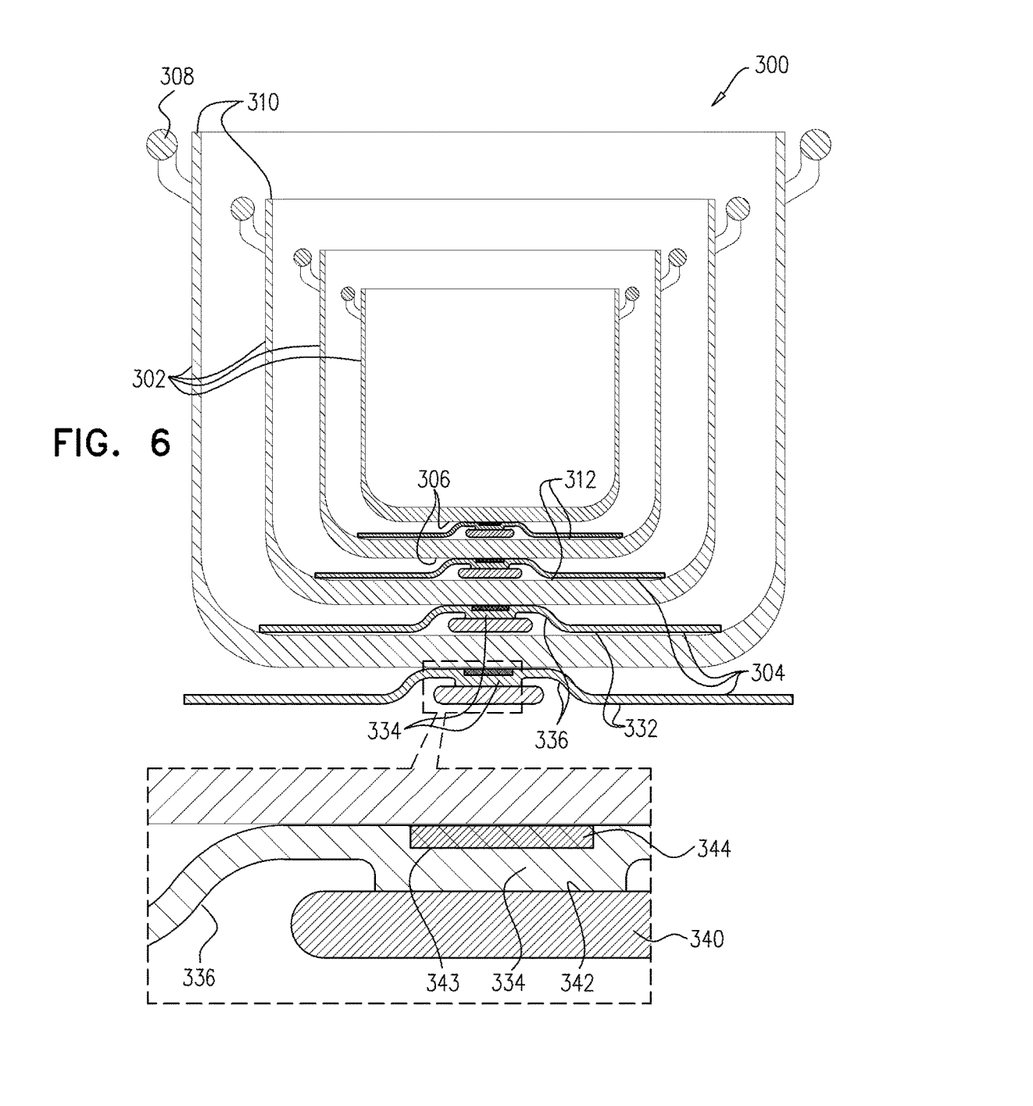
FIG. 6 is a simplified sectional illustration taken along lines VI-VI in FIG. 5.

Reference is now made to FIG. 5, which is a simplified illustration of a fully nested set 300 of pots 302 constructed and operative in accordance with another embodiment of the present invention, each pot 302 having a lid 304 removably attached thereto at a bottom thereof, and to FIG. 6, which is a simplified sectional illustration, taken along lines VI-VI in FIG. 5.

As seen in FIGS. 5 & 6, there is provided a fully nested plurality of pots 302 of a variety of sizes, each having removably attached thereto, at a bottom outside surface 306 thereof, a lid 304 of a size corresponding to the size of the pot 302. In the embodiment of FIGS. 5 & 6, each of pots 302 includes a pair of pot handles 308 which extend outwardly therefrom, but in contrast to the embodiment of FIGS. 1 & 2, not to an extent that each handle 308 of each of the pots 302 rests on the top edge 310 of another pot 302 into which it is partially nested. Rather, in the embodiment of FIGS. 5 & 6, the lid of an upper pot 302 rests on a bottom inner surface 312 of a lower pot 302 in which the upper pot 302 is fully nested.

As seen particularly clearly in FIG. 6, in the embodiment of FIGS. 5 and 6, each pot lid 304 includes an outer planar ring portion 332 and a central inner planar portion 334, which is recessed with respect to outer planar ring portion 332 and integrally joined thereto by an intermediate ring portion 336, preferably having a curved cross section. A recessed lid handle 340 is preferably fixedly attached to a surface 342 of central inner planar portion 334 of lid 304. Preferably a top surface of recessed lid handle 340 is co-planar with a top surface of outer planar ring portion 332.

In the embodiment of FIGS. 5 & 6, each lid 304 is preferably provided at a surface 343 of central inner planar portion 334, opposite to surface 342, with an inlaid magnet 344, which is removably magnetically attached to bottom outside surface 306 of a correspondingly sized pot 302. It is appreciated that the entire pot 302 or, alternatively, the bottom outside surface 306 thereof, is formed of a ferromagnetic material, such as many types of stainless steel, which is magnetically attracted to inlaid magnet 344.

Comparing the embodiment of FIGS. 5 & 6 with the embodiment of FIGS. 1 & 2, it is additionally seen that the orientation of each lid 304 relative to the pot 302 to which it is attached is upside down as compared with the orientation of each lid 104 relative to the pot 102 to which it is attached.

Figure 7:
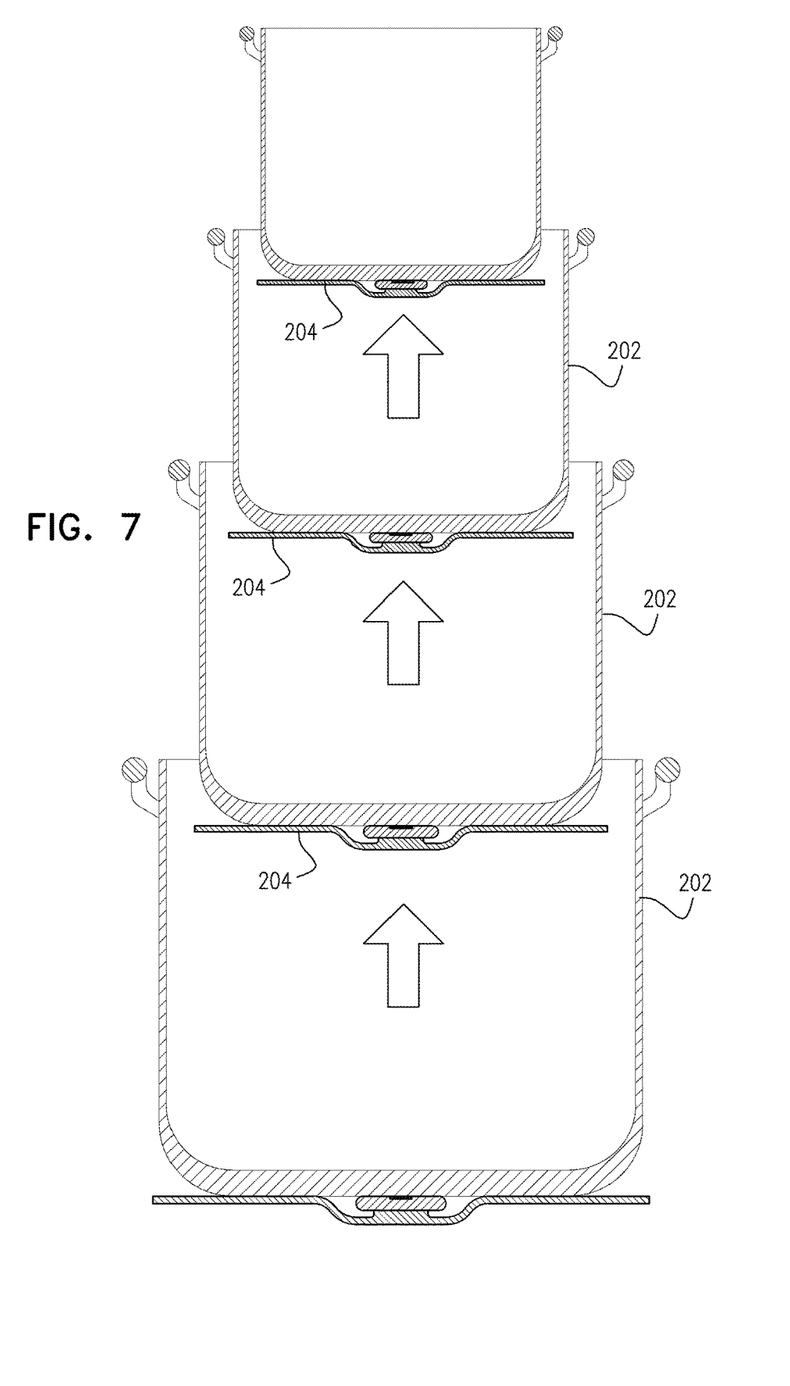
FIG. 7 is a simplified sectional illustration of unstacking of the pots in the embodiment of FIGS. 3 and 4.

Reference is now made to FIG. 7, which is a simplified sectional illustration of unstacking of the pots in the embodiment of FIGS. 3 and 4. It is seen that each of pots 202 which is magnetically joined to its corresponding lid 204 is readily separated and removed from the pots and lids lying therebelow.

Figure 8:
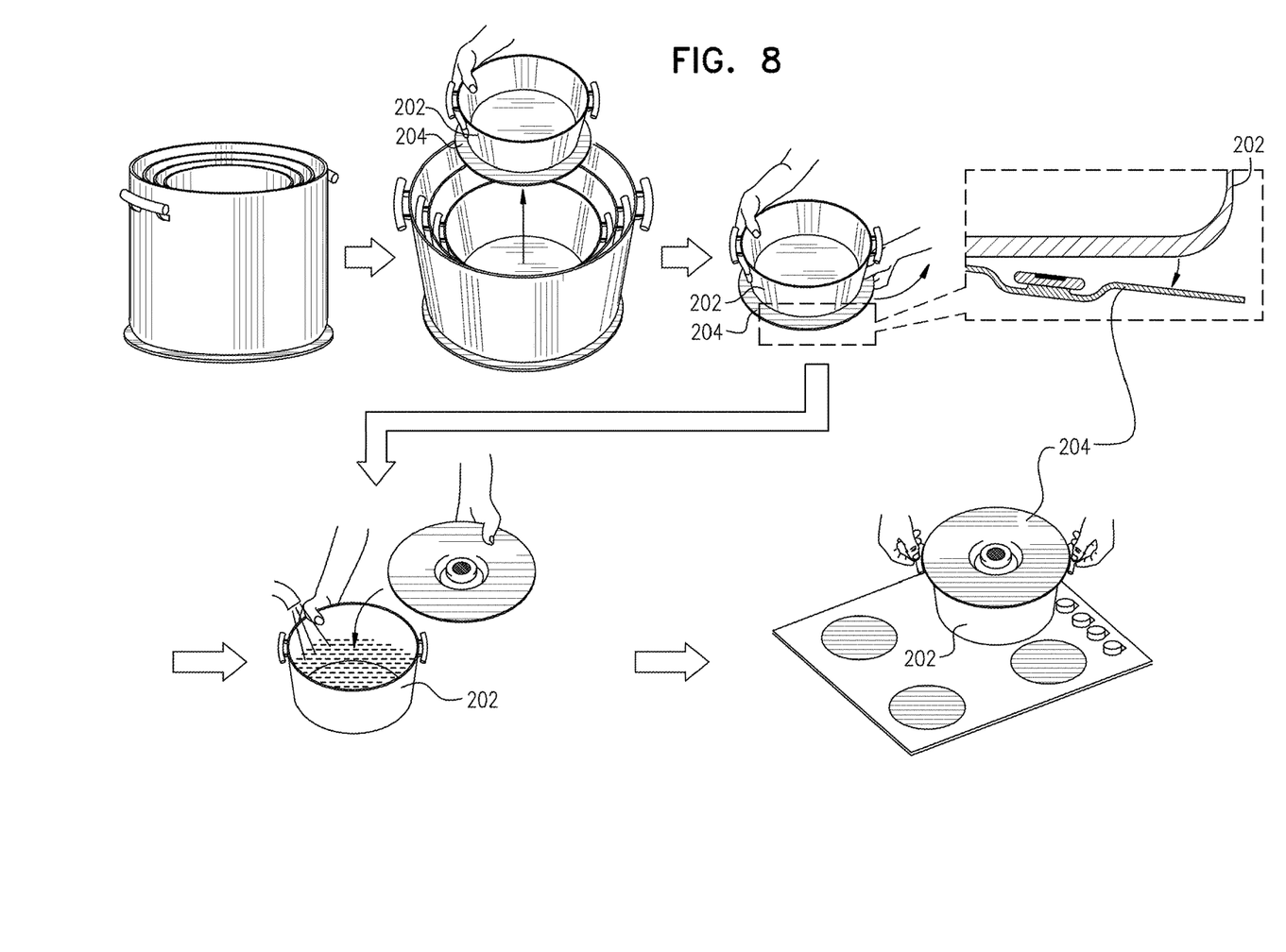
FIG. 8 is a simplified pictorial illustration of unstacking of one of the pots in the embodiment of FIGS. 3 and 4, detachment of the lid therefrom and utilization of the pot and the lid.

Reference is now made to FIG. 8, which is a simplified pictorial illustration of unstacking of the one of the pots 202 in the embodiment of FIGS. 3 and 4, detachment of the lid 204 therefrom and utilization of the pot and the lid. As seen in FIG. 8, a pot 202 and its lid 204, which is magnetically removably attached thereto and therebelow, are readily removed from a stack of pots 202 as a single unit. Thereafter, the lid 204 is readily separated from the bottom of the corresponding pot 202 and placed over the pot 202 prior to cooking.

Figure 9A:
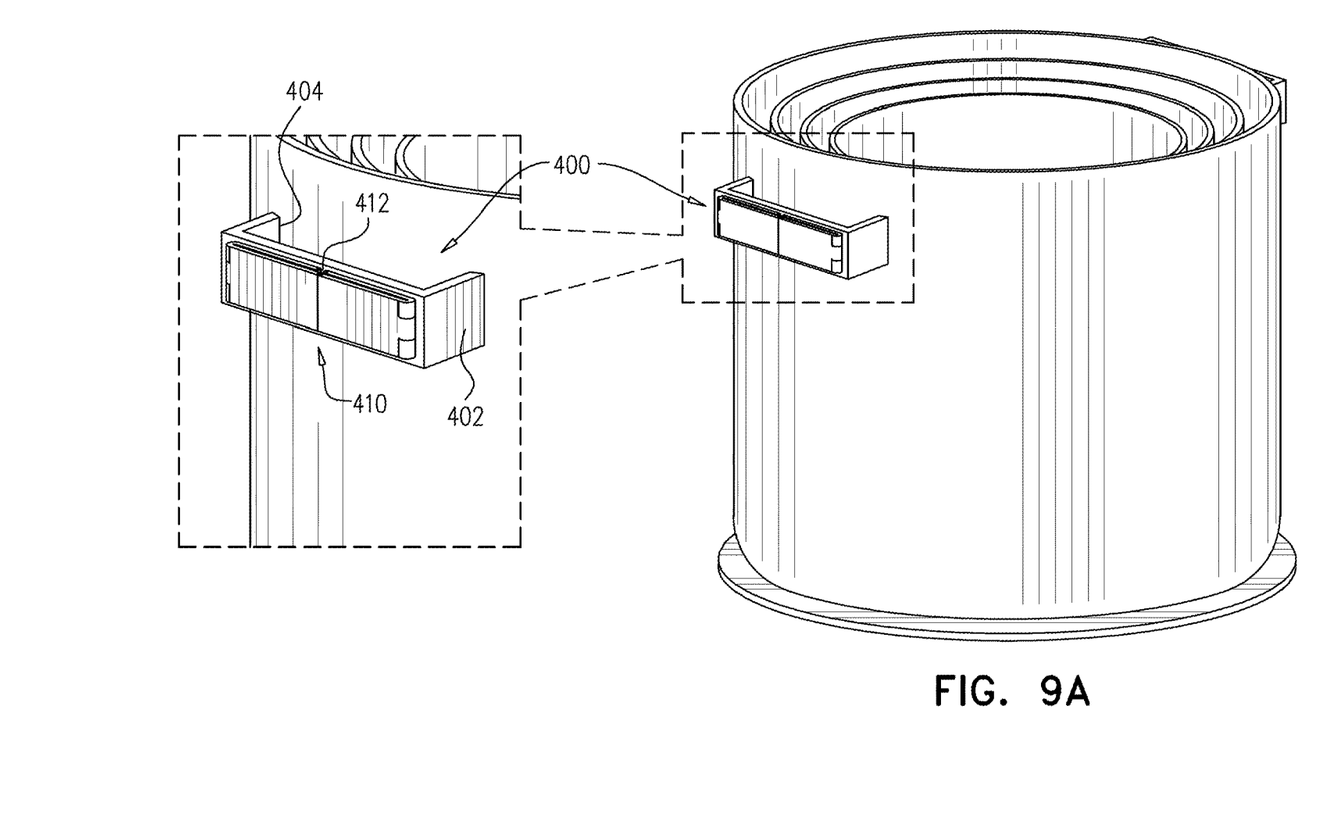
FIGS. 9A, 9B and 9C are simplified illustrations of three operative orientations of one embodiment of an extendable pot handle useful in the embodiments of FIGS. 3-8.
Figure 9B:
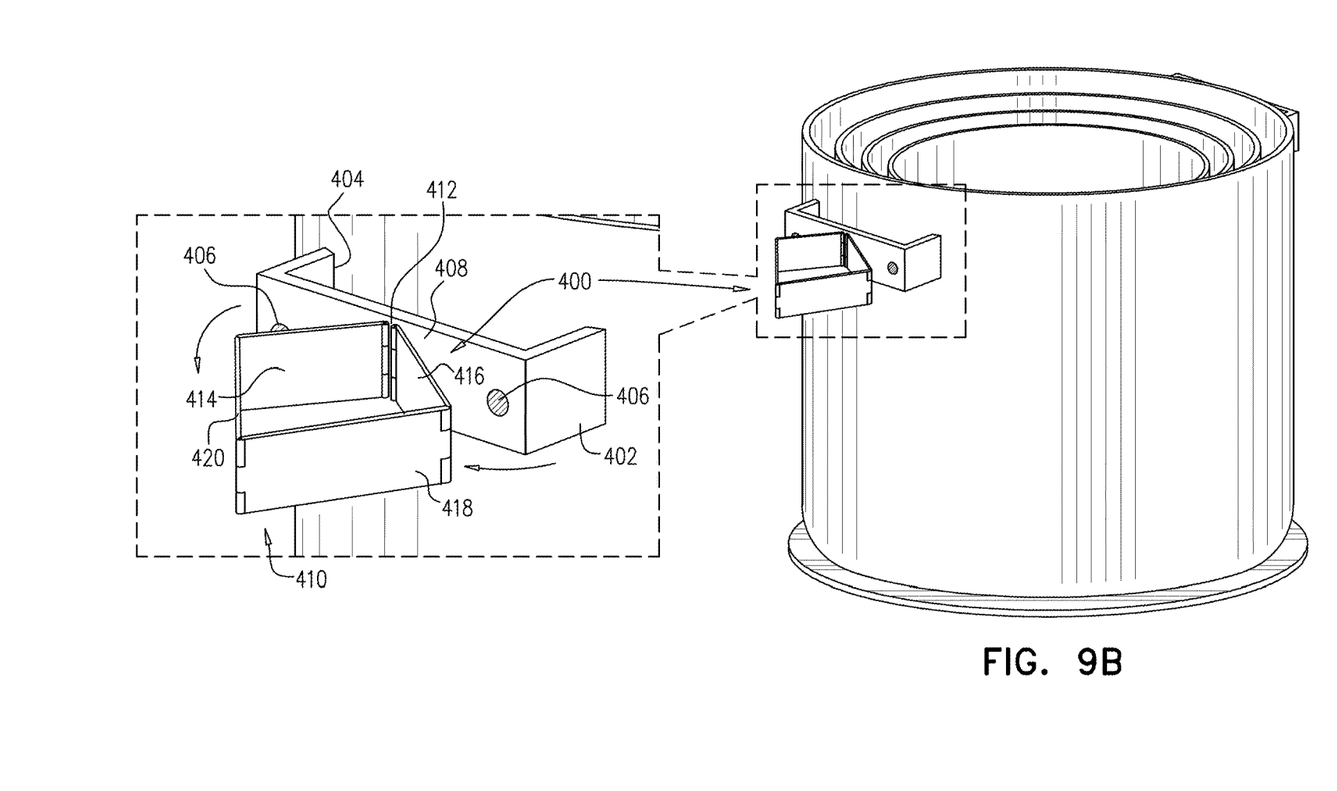
Figure 9C:
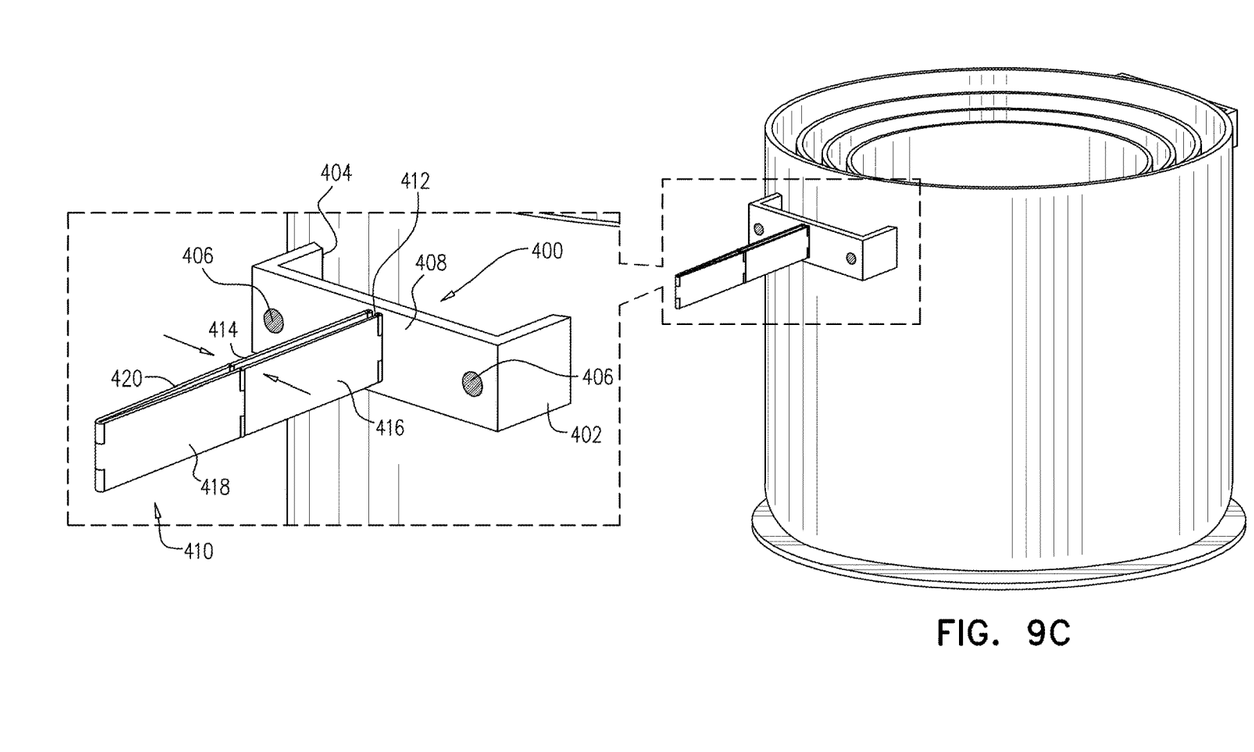

Reference is now made to FIGS. 9A, 9B and 9C, which are simplified illustrations of three operative orientations of one embodiment of an extendable pot handle assembly 400 useful as an alternative handle mechanism in the embodiments of FIGS. 3-8. As seen particularly clearly in FIG. 9B, the extendible pot handle assembly 400 preferably comprises a C-shaped handle base 402, which is fixedly attached at its ends 404 to a side of a pot, such as pot 202. A pair of magnets 406 are preferably imbedded in or otherwise mounted to a central portion 408 of base 402.

A hinged handle extender assembly 410 is preferably mounted onto central base portion 408 at a location 412 thereon. Hinged handle extender assembly 410 preferably includes four generally planar elements 414, 416, 418 and 420, each of which is mutually hinged with respect to the planar elements adjacent thereto and is preferably formed of a ferromagnetic material. Elements 414 and 416 are also hingedly mounted onto central base portion 408 at location 412.

As seen in FIGS. 9A-9C, the hinged handle extender assembly 410 has three principal operative orientations. A fully retracted operative orientation is shown in FIG. 9A, wherein all of planar elements 414, 416, 418 and 420 lie parallel to central base portion 408 and are removably retained in this operative orientation by attraction thereof by magnets 406.

A partially extended operative orientation is shown in FIG. 9B. This orientation is preferably realized by manually pulling elements 418 and 420 partially outwardly from pot 202 and from central base portion 408.

A fully extended operative orientation is shown in FIG. 9C. This orientation is preferably realized by further manually pulling elements 418 and 420 outwardly from pot 202 until elements 414, 416, 418 and 420 are generally coplanar in a plane preferably, but not necessarily, perpendicular to the plane of central base portion 408.

Figure 10A:
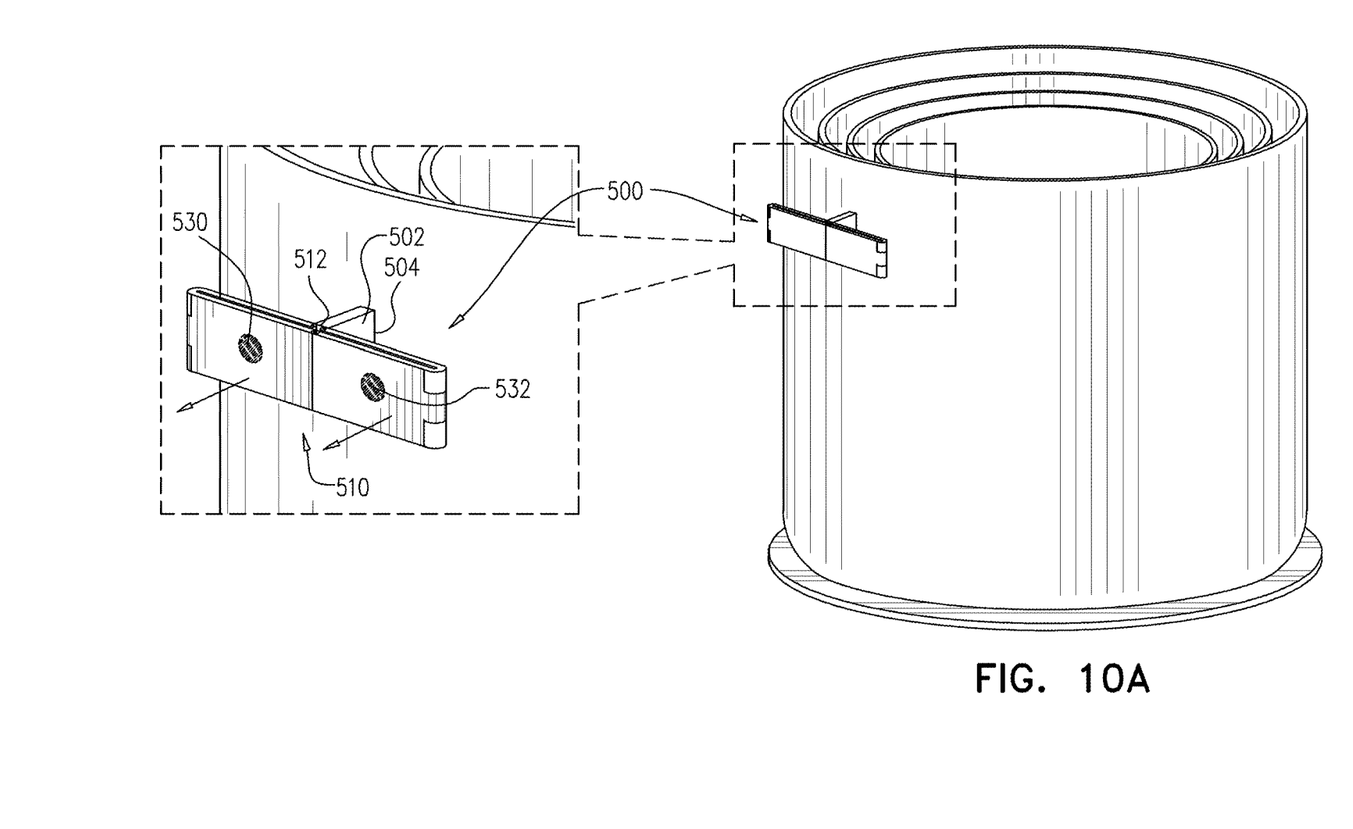
FIGS. 10A, 10B and 10C are simplified illustrations of three operative orientations of another embodiment of an extendable pot handle useful in the embodiments of FIGS. 3-8.
Figure 10B:
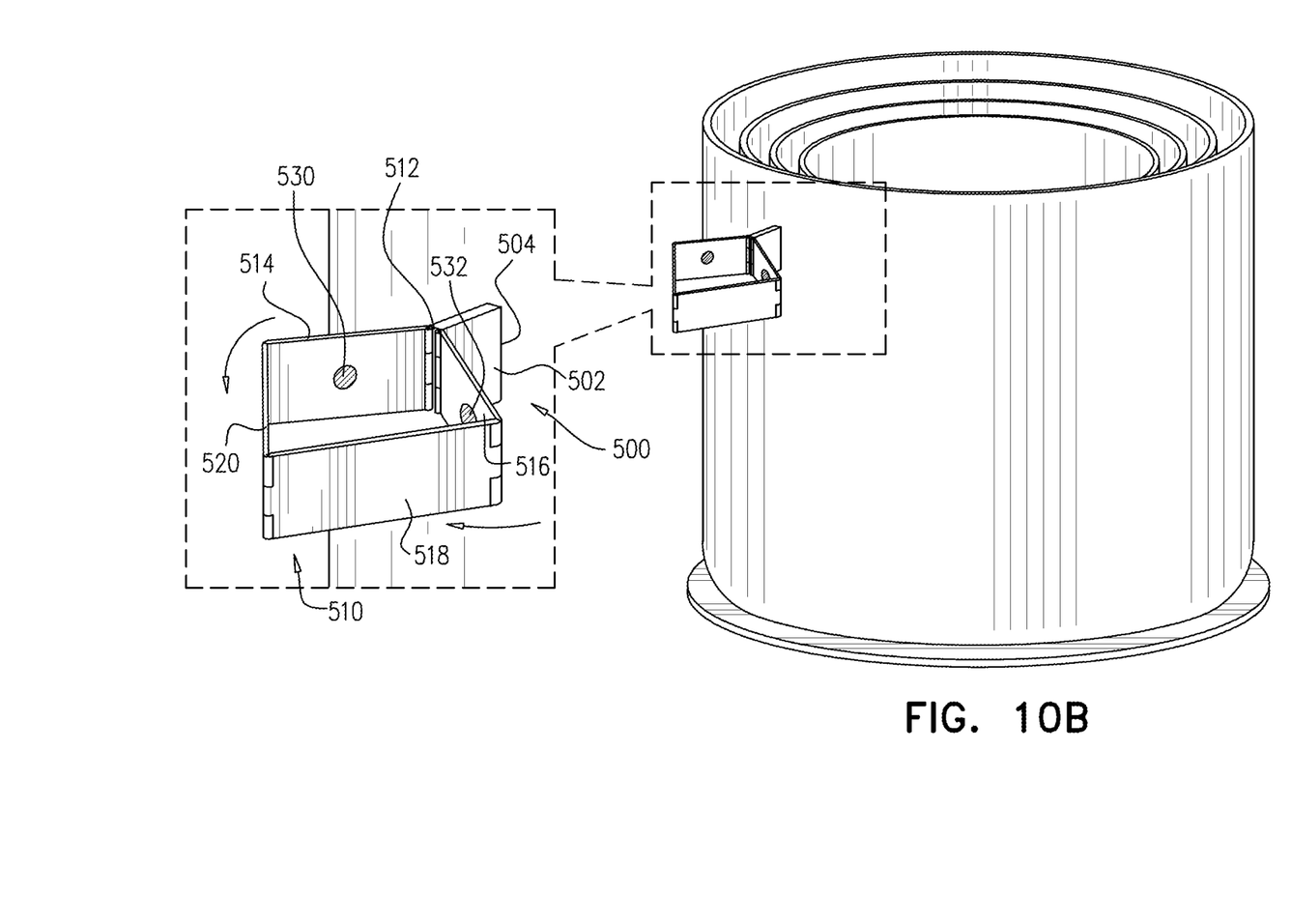
Figure 10C:
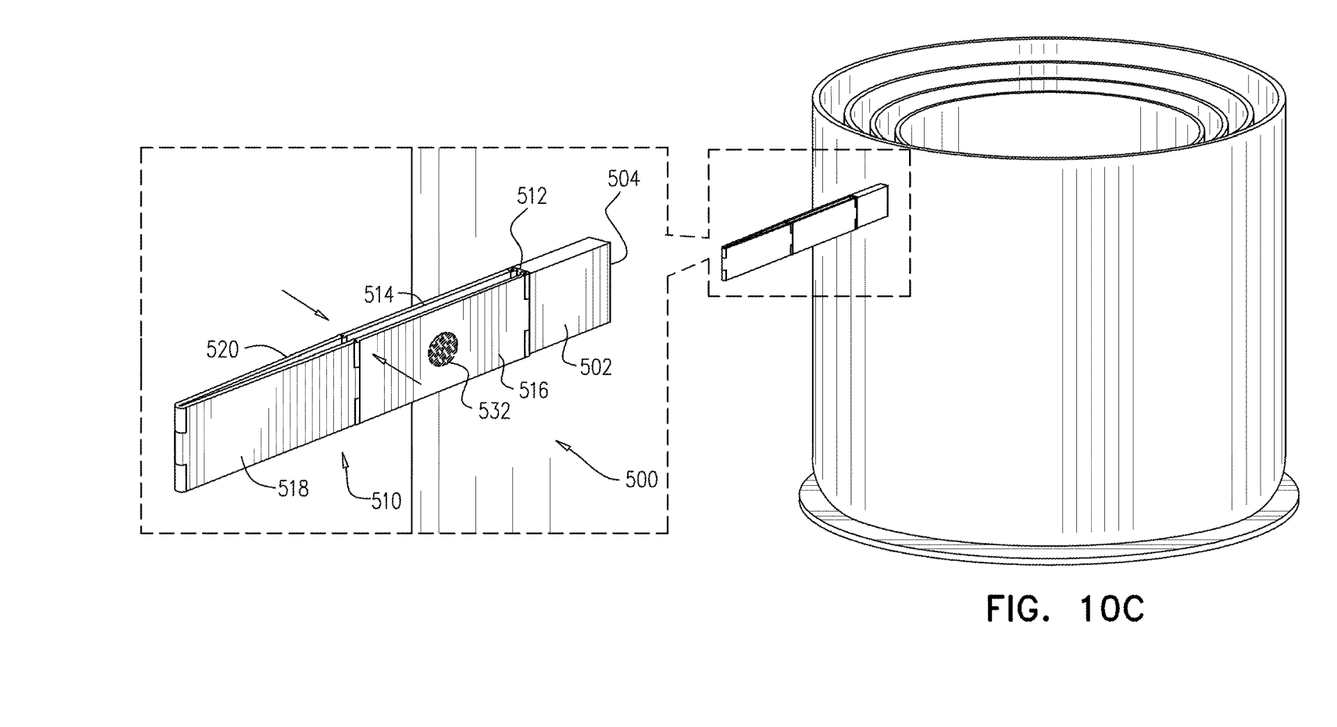

Reference is now made to FIGS. 10A, 10B and 10C, which are simplified illustrations of three operative orientations of another embodiment of an extendable pot handle useful in the embodiments of FIGS. 3-8.

As seen particularly clearly in FIG. 10B, the extendible pot handle assembly 500 preferably comprises a radially outwardly extending handle base 502, which is fixedly attached at an end 504 to a side of a pot, such as pot 202.

A hinged handle extender assembly 510 is preferably mounted onto handle base 502 at an end 512 thereof. Hinged handle extender assembly 510 preferably includes four generally planar elements 514, 516, 518 and 520, each of which is mutually hinged with respect to the planar elements adjacent thereto and is preferably formed of a ferromagnetic material. Elements 514 and 516 are also hingedly mounted onto handle base 502 at location 512.

A pair of magnets 530 and 532 are preferably imbedded in or otherwise mounted onto respective elements 514 and 516.

As seen in FIGS. 10A-10C, the hinged handle extender assembly 510 has three principal operative orientations. A fully retracted operative orientation is shown in FIG. 10A, wherein all of planar elements 514, 516, 518 and 520 lie in a plane perpendicular to base 502 and are removably retained in this operative orientation by attraction of planar elements 518 and 520 by magnets 530 and 532.

A partially extended operative orientation is shown in FIG. 10B. This orientation is preferably realized by manually pulling elements 518 and 520 partially outwardly from pot 202 and from base 502.

A fully extended operative orientation is shown in FIG. 10C. This orientation is preferably realized by further manually pulling elements 518 and 520 outwardly from pot 202 until elements 514, 516, 518 and 520 are generally coplanar in a plane preferably, but not necessarily, parallel to base 502.

It will be appreciated by persons skilled in the art that the present invention is not limited by what has been particularly described and shown in the drawings but also includes combinations and subcombinations of the features described and shown as well as modifications and variations thereof which are not in the prior art.

The invention claimed is:

1. A nestable set of pots comprising;
    a plurality of pots which are nestable together; and
    a plurality of lids, each lid corresponding to a pot and being removably attached to an outside bottom surface thereof,
    at least one of said plurality of lids including a base portion and a handle portion, said handle portion including a magnet.

2. A nestable set of pots according to claim 1 and wherein at least one of said plurality of lids is magnetically attached to an outside bottom surface of a corresponding pot.

3. A nestable set of pots according to claim 1 and wherein said handle portion is recessed with respect to at least a peripheral portion of said base portion.

4. A nestable set of pots comprising;
    a plurality of pots which are nestable together; and
    a plurality of lids, each lid corresponding to a pot and being removably attached to an outside bottom surface thereof,
    at least one of said plurality of lids including a base portion and a handle portion, said base portion including a magnet.

5. A nestable set of pots according to claim 4 and wherein at least one of said plurality of lids is magnetically attached to an outside bottom surface of a corresponding pot.

6. A nestable set of pots according to claim 4 and wherein said handle portion is recessed with respect to at least a peripheral portion of said base portion.

7. A nestable set of pots comprising;
    a plurality of pots which are nestable together; and
    a plurality of lids, each lid corresponding to a pot and being removably attached to an outside bottom surface thereof,
    at least one of said plurality of pots including at least one articulated exterior handle having a first retracted position and a second extended position,
    said articulated exterior handle including at least one magnet for selectably retaining said articulated exterior handle in said second extended position.

8. A nestable set of pots according to claim 7 and wherein said articulated exterior handle includes at least one magnet for selectably retaining said articulated exterior handle in said first retracted position.

* * * * *